(No Model.)
H. WOODS.
WATER PURIFIER.
No. 525,304.     Patented Aug. 28, 1894.
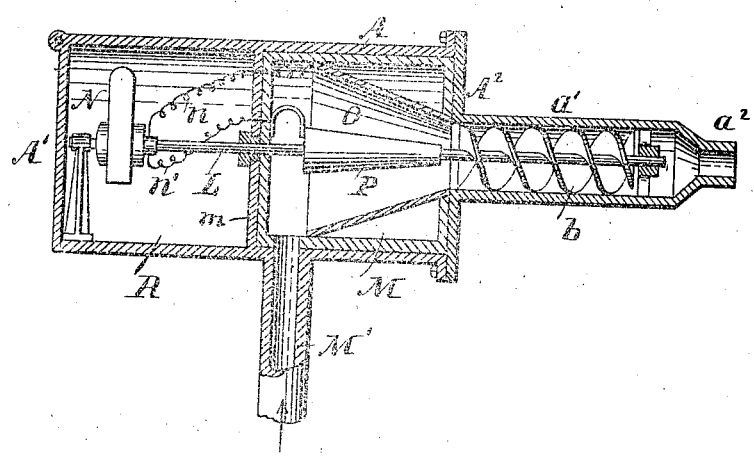
Witnesses.
W. R. Edelin.
O. W. Bailey.
Inventor
Hampton Woods,
By Scory N. Lott,
his Attorney.

UNITED STATES PATENT OFFICE.

HAMPTON WOODS, OF CHICAGO, ILLINOIS, ASSIGNOR OF ONE-HALF TO HERBERT CASSARD, OF BALTIMORE, MARYLAND.

WATER-PURIFIER.

SPECIFICATION forming part of Letters Patent No. 525,304, dated August 28, 1894.

Application filed October 9, 1893. Serial No. 487,655. (No model.)

*To all whom it may concern:*

Be it known that I, HAMPTON WOODS, a citizen of the United States, residing at Chicago, in the county of Cook and State of Illinois, have invented certain new and useful Improvements in Water-Purifiers; and I do hereby declare the following to be a full, clear, and exact description of the invention, such as will enable others skilled in the art to which it appertains to make and use the same, reference being had to the accompanying drawing, and to letters of reference marked thereon, which forms a part of this specification.

The present invention has in view the purification of water for steam boilers and the prevention of scaling, and the loosening of existing scale through the agency of an electric current acting on the feed water and its impurities before it enters the boiler. In appliances of this class as heretofore made voltaic piles have been used but they require to be replaced from time to time and are therefore attended with considerable expense and possible injury to the boiler. Devices employing a magneto electric current have also been tried, but as heretofore experimented with the current has been taken from an outside source or battery or generated by special dynamo independent of the purifier, though it may be as an adjunct thereto. Such machines require power from an outside source for running the dynamo and also involve additional care and attention.

The object of the present invention is to provide an apparatus of the character employing a magneto electric current but which shall be complete and self contained, and to this end I employ the flow of water therethrough or the power of the current of water fed to the boiler to operate an electric generator and develop an electric current which acting on the water and impurities flowing through the device performs its work of purification; and the invention consists, of the novel combination and arrangement of parts, substantially as hereinafter more fully described, and pointed out in the claims.

The accompanying drawing represents a longitudinal sectional view of my invention.

A is a preferably cylindrical shell or gland having a head A', and a head A² having a reduced preferably cylindrical extension a' to which is connected the outflow pipe a².

L is the power shaft carrying, on that portion thereof within the reduced extension a' of the shell or gland A, a water motor or propeller b, and the shaft of which is extended through the rear head m of the purifier chamber, M, and the armature of a small generator N, is mounted on this rearwardly extended shaft. The water enters the purifier chamber through the pipe M' and the circuit wires n, n', from the generator are coupled to electrodes, O and P, in contact with the water flowing through the purifier. One of the electrodes, O, is constructed in the form of a hopper through which the shaft L passes, and the other electrode P, of a cone shape, is carried by the shaft within the hopper. The generator may be suitably incased in a chamber R near the water purifier chamber and closed in so as to be protected from dust, yet readily accessible for attention and supervision.

Having thus described my invention, what I claim as new, and desire to secure by Letters Patent, is—

1. The combination of a water motor and an electric generator arranged on a common shaft, a gland in a feed water passage to a boiler containing said water motor, and an electric circuit from the generator having terminals at opposite points in the feed water passage, substantially as and for the purpose set forth.

2. The combination of a water motor and an electric generator arranged on a common shaft, a water purifying chamber having inlet and outlet pipes to adapt it to form the feed water passage to a boiler, with one of said pipes containing said water motor, and an electric circuit from the generator having terminals at opposite points in the water purifying chamber, substantially as and for the purpose set forth.

In testimony whereof I affix my signature in presence of two witnesses.

HAMPTON WOODS.

Witnesses:
STORY B. LADD,
I. C. STRIDER.